Sept. 13, 1966   F. W. HAYES, SR   3,272,243
PLUG CUTTER
Filed Oct. 11, 1963   2 Sheets-Sheet 1
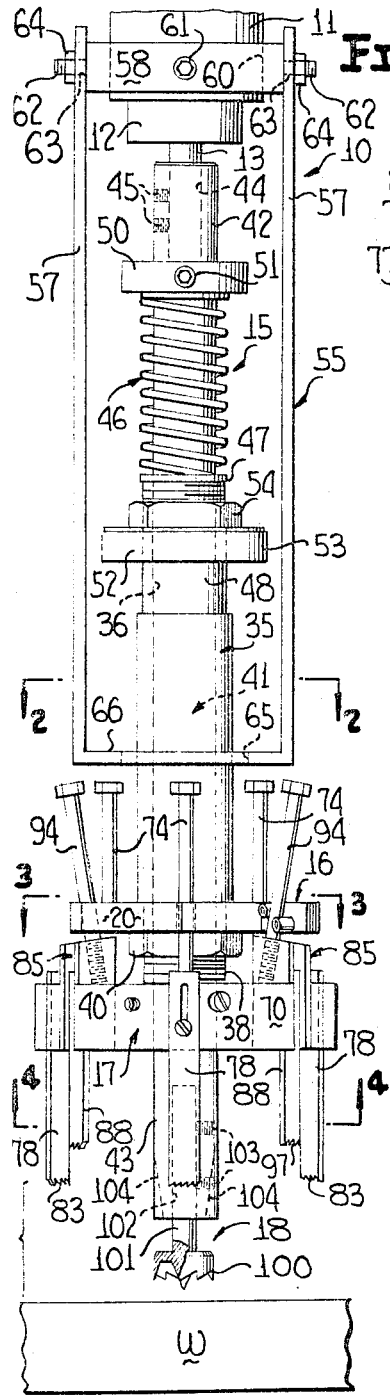
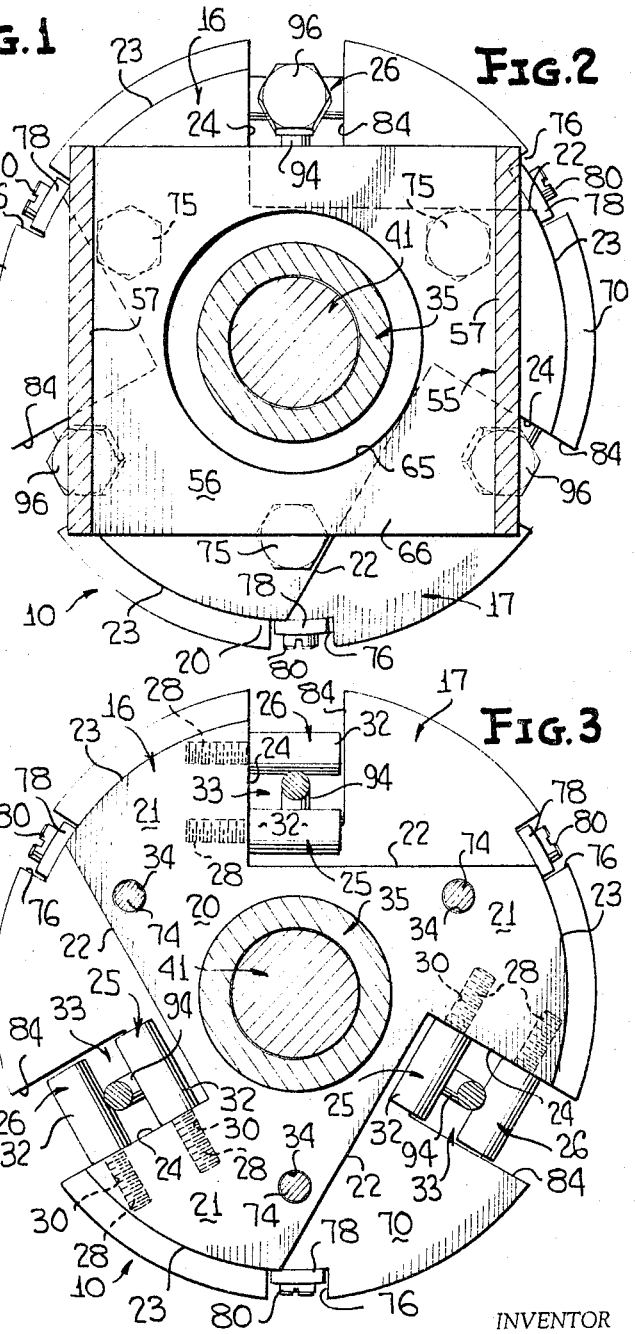
INVENTOR
FRANK W. HAYES, Sr.
BY
Mason, Porter, Diller & Stewart
ATTORNEYS Sept. 13, 1966          F. W. HAYES, SR          3,272,243
                           PLUG CUTTER
Filed Oct. 11, 1963                          2 Sheets-Sheet 2
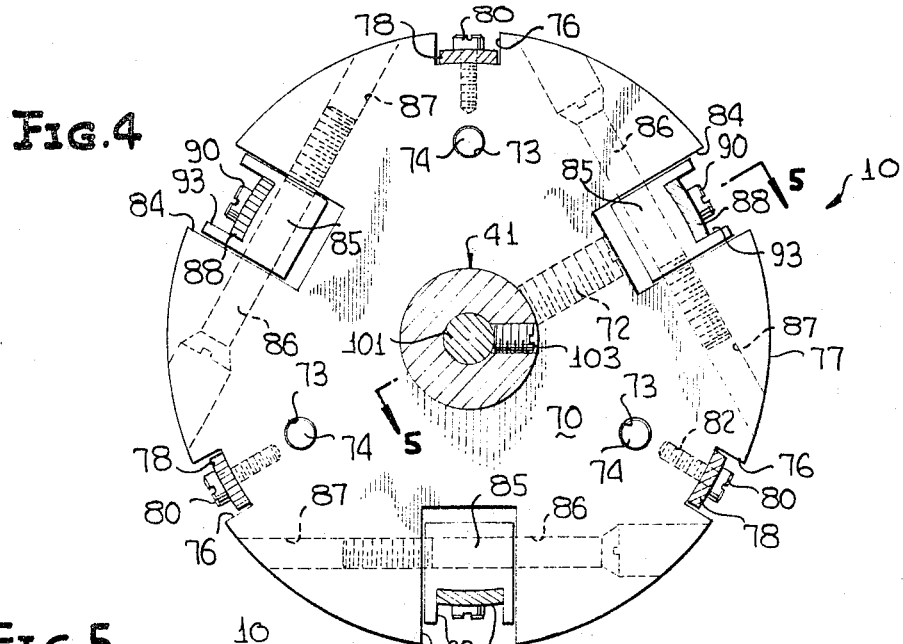
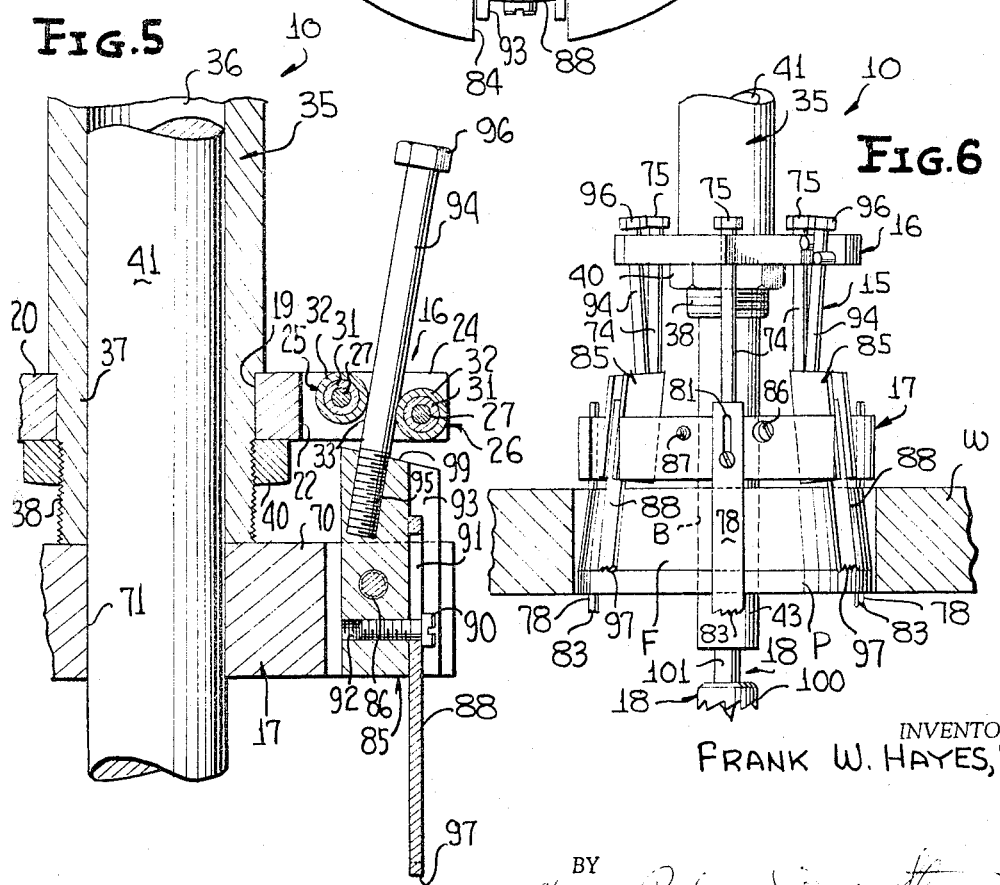
INVENTOR
FRANK W. HAYES, Sr.
BY
ATTORNEYS

3,272,243
PLUG CUTTER
Frank W. Hayes, Sr., 4017 Carol Drive, Jackson, Miss.
Filed Oct. 11, 1963, Ser. No. 315,633
8 Claims. (Cl. 144—20)

This invention relates to a novel apparatus for manufacturing paper roll plugs of the type having a generally frusto-conical portion terminating in a cylindrical portion and in particular, to a novel cutter mechanism for substantially simultaneously cutting both of these portions from stock material in a highly efficient and relatively rapid manner.

An object of this invention is to provide a novel cutter mechanism including a rotatable cutter unit adapted for cutting a paper roll plug having a frusto-conical portion terminating in a cylindrical portion, the cutter unit including first and second cutter means, the first and second cutter means having respective first and second cutting portions each defining a generally cylindrical volume upon rotation of the cutter unit, and means for shifting one of the cutter means with respect to the other of the cutter means to divide a generally conical volume whereby the cutter unit can form a frusto-conical paper roll plug terminating in a cylindrical portion.

A further object of this invention is to provide a novel cutter mechanism of the type immediately above described wherein the one cutter means is pivoted angularly with respect to the other cutter means to establish substantially coaxial conical and cylindrical volumes whereby the first and second cutter means conjunctively cut a frusto-conical paper roll plug having a cylindrical terminal portion.

A further object of this invention is the provision of a novel cutter mechanism comprising a rotatable cutter unit, the cutter unit including first and second supports, the second support carrying first and second cutter means, the second cutter means including a plurality of blade holder bodies each pivotally carried thereby, and control means for controlling the movement of the blade holder bodies upon relative movement between the supports, the control means including cam means for pivoting each of the bodies upon relatively reciprocal movement between the supports and also including guide means for maintaining alignment between the supports during relative movement thereof.

A further object of this invention is to provide a novel method of cutting a paper roll plug having a frusto-conical portion terminating in a cylindrical portion by performing the steps of initiating a rotary cutting operation about a single axis and at preselected major and minor cutting radii, and progressively altering the cutting operation initiated at the minor radius by increasing the minor cutting radius toward the major cutting radius during the cutting operations to simultaneously cut a tapered peripheral surface and a cylindrical surface from stock material to form a cylindrically shouldered, frusto-conical paper roll plug.

With the above and other objects in view that will hereinafter appear, the nature of the invention will be more clearly understood by reference to the following detailed description, the appended claims and the several views illustrated in the accompanying drawings:

In the drawings:

FIGURE 1 is a fragmentary elevational view of a cutter mechanism constructed in accordance with this invention, and illustrates a cutter unit overlying a piece of stock material prior to the initiation of a cutting operation.

FIGURE 2 is an enlarged sectional view taken along line 2—2 of FIGURE 1, and illustrates a portion of a mechanism for providing relative reciprocal movement between first and second assemblies of the cutter unit.

FIGURE 3 is an enlarged sectional view taken along line 3—3 of FIGURE 1, and illustrates a portion of a control mechanism between first and second assemblies of the cutter unit for pivoting selective ones of the cutter means during relative reciprocation between the assemblies.

FIGURE 4 is an enlarged sectional view taken along line 4—4 of FIGURE 1, and illustrates a plurality of blade holder bodies pivotally mounted to one of the assemblies of the cutter unit.

FIGURE 5 is an enlarged fragmentary sectional view taken along line 5—5 of FIGURE 4, and more clearly illustrates one of the plurality of pivotally mounted blade holder bodies, a camming element carried by the blade holder body, and a pair of rollers cooperable with the cam element for pivoting the blade holder body during relative reciprocation between the assemblies of the cutter unit.

FIGURE 6 is a fragmentary side elevational view with portions shown in section for clarity, and illustrates the cutter unit of FIGURE 1 at the completion of the cutting operation and the formation of a paper roll plug having a frusto-conical portion terminating in a cylindrical portion.

An apparatus or cutter mechanism constructed in accordance with this invention is shown best in FIGURES 1 through 5 of the drawings, and is generally designated by the reference numeral 10. The cutter mechanism 10 comprises a vertical standard (not shown) having a base at a bottom end portion thereof and a conventional drill or drill press 11 (FIGURE 1) mounted for vertical adjustment upon the vertical standard in a known manner. The drill press 11 includes a drill press quill 12 in which is journalled a rotatable shaft 13. The shaft 13 is driven or rotated in a known manner by a conventional motor of the drill press (not shown).

A cutter assembly or cutter unit 15 is carried by the shaft 13 of the drill press in a manner to be described more fully hereafter. The cutter unit 15 comprises a first assembly 16, a second assembly 17 and a third assembly 18.

The first assembly 16 is best illustrated in FIGURES 3 and 5 of the drawings, and comprises a metallic support or plate 20 having an axial opening or bore 19 (FIGURE 5). The plate 20 includes three identical radial arms 21, each of which is set off by a substantially tangential wall or surface 22, a circumferential wall or surface 23, and a substantially radial wall or surface 24. Adjacent ones of the radial walls 24, are spaced from each other approximately 120° and intersect an associated one of the tangential walls 22 at an angle of approximately 90°. An axially innermost roller 25 and an axially outermost roller 26 are each carried by an associated one of the radial walls 24. The rollers 25 and 26 are each carried by an unthreaded shaft portion 27 (FIGURE 5) having a threaded end portion 28 (FIGURE 3) received in an identical threaded bore 30 opening outwardly through each of the radial walls 24 of the plate 20. An identical antifriction bearing or sleeve 31 (FIGURE 5) is interposed between the unthreaded shaft portion 27 and an external cylindrical roller portion 32 of each of the rollers 25 and 26. The rollers 25 and 26 are horizontally offset from one another, as is best illustrated in FIGURE 5 of the drawings, and the roller portions 32, 32 of the rollers 25 and 26 are spaced from one another to establish a gap or opening 33 between each of the rollers 25 and 26.

An identical guide opening or aperture 34 is formed in each of the arms 21 of the plate 20. The openings 34 are set off from one another by an angle of approximately 120° (FIGURE 3) and perform a function which is to be described more fully hereafter.

The plate or support 20 of the first assembly 16 is secured to a tubular sleeve 35, in a manner clearly illustrated in FIGURE 5 of the drawings. The tubular sleeve 35 includes a bore 36 and a lower reduced end portion 37 threaded at 38. The reduced end portion 37 of the tubular sleeve 35 is received in the axial opening 19 of the plate 20, and a nut 40 threaded to the threaded portion 38 of the tubular sleeve 35 secures the plate 20 to this reduced end portion.

A main shaft 41 (FIGURE 1) having an upper end portion 42 and a lower end portion 43 is received in the bore 36 of the tubular sleeve 35. The upper end portion 42 of the main shaft 41 is axially bored at 44. The shaft 13 of the drill press quill 12 is received in the axial bore 44 on the main shaft 41, and is positively secured thereto by a pair of set screws 45.

A compression spring 46 surrounds the upper end portion 42 of the main shaft 41. The compression spring 46 is interposed between a washer 47 seated on an upper threaded end portion 48 of the tubular sleeve 35 and an adjusting collar 50 carrying a set screw 51. The force of the compression spring 46 can be increased or decreased by moving the adjusting collar 50 toward or away from the washer 47, and thereafter tightening the set screw 51 against the upper portion 42 of the main shaft 41 in an obvious manner.

A thrust ball bearing 52 surrounds the upper end portion 48 of the tubular sleeve 35 and a nut 54 threaded upon the end portion 48 secures the inner race portion (unnumbered) of the ball bearing 52 upon this upper end portion in the manner clearly shown in FIGURE 1 of the drawings. This permits the inner race, the sleeve 35 and the shaft 41 to rotate when the outer race portion (unnumbered) of the ball bearing 52 contacts an abutment member in a manner to be described more fully hereafter.

A substantially U-shaped bracket 55 having a bight portion 56 (FIGURE 2) and two identical legs 57, 57 is secured to the drill press 11 by a clamping collar 58. The clamping collar 58 has an opening 60 into which projects the drill press 11, and a set screw 61 at diametrically opposed portions of the collar 58 for securing the collar 58 to the drill press 11, in an obvious manner. An identical threaded stud 62 projecting from diametrically opposed portions of the collar 58 is received in an identical opening 63 in each of the legs 57 of the U-shaped bracket 55. An identical nut 64 received on each of the threaded studs 64 secure the U-shaped bracket to the clamping collar 58 in the manner illustrated in FIGURE 1 of the drawings.

The bight portion 56 of the U-shaped bracket 55 is apertured at 65 (FIGURES 1 and 2) and receives therethrough the tubular sleeve 35. An upper surface or wall 66 of the bight portion 56 of the U-shaped bracket 55 is adapted to contact the ball bearing 52 and act as a stop to limit downward movement of the first assembly 16 carried by the tubular sleeve 35 during a cutting operation as will appear more apparent hereafter.

The second assembly 17 comprises a substantially circular, metallic plate or support 70 (FIGURES 4 and 5) which is axially apertured or bored at 71 for the receipt therein of the main shaft 41. A set screw 72 (FIGURE 4) secures the plate 70 of the second assembly 17 to the main shaft 41 as shown in FIGURE 4 of the drawings. An identical threaded bore 73 is formed in the support or plate 70 in underlying axial alignment with an associated one of each of the openings 34 formed in the first assembly 16. An identical guide bolt 74 having a head 75 is freely received through each of the openings 34 in the plate 20 of the first assembly 16, and is threadably secured in an associated one of the axially aligned threaded bores 73 of the second assembly 17. The guide pins or guide bolts 74 maintain alignment between the first assembly 16 and the second assembly 17 when these assemblies are reciprocated with respect to one another in a manner to be described more fully hereafter.

The support or plate 70 of the second assembly 17 is provided with three relatively shallow, identical U-shaped slots or grooves 76 opening outwardly through a circumferential portion 77 of the plate 70. Adjacent ones of the U-shaped slots 76 are spaced from each other by an angle of approximately 120°. An identical cutting means or blade 78 is received in each of the U-shaped slots 76 and is adjustably secured therein by a screw 80 passed through a slot 81 in each of the blades 78 and received in an associated radial threaded bore 82 of the plate 70. Each of the blades 78 terminates in a lower cutting edge 83 (FIGURE 1). Upon rotation of the second assembly 17, the blades 78 define a substantially cylindrical volume.

The plate 70 is also provided with three identical relatively deep, U-shaped grooves or slots 84 opening outwardly through the circumferential wall or surface 77 of the plate 70. Each of the U-shaped slots 84 is positioned between adjacent ones of the U-shaped slots 76, and adjacent ones of the three U-shaped slots 84 are spaced from each other by an angle of approximately 120°.

An identical blade holder body 85 (FIGURES 4 and 5) is pivotally mounted in each of the U-shaped slots 84 by an identical journalling pin or bolt 86 received in a bore 87 formed in the plate 70 in a manner clearly illustrated in FIGURE 4 of the drawings. An identical cutting means or blade 88 is secured to each of the blade holder bodies 85 by an identical screw 90 (FIGURE 5) passed through an elongated slot 91 formed in the blade 88 and received in a threaded bore 92 of each of the blade bodies 85. Each of the blades 88 is adjusted with respect to an associated one of the bodies 85 by the screw 90 in a manner deemed obvious from FIGURE 5 of the drawings. Each of the blades 88 is confined in a U-shaped slot or groove 93 in each of the bodies 85, as shown in FIGURE 4 of the drawings.

A central mechanism between the assemblies 16 and 17 comprises a generally elongated camming element or bolt 94 passed through each of the gaps 33 (FIGURE 5) between the rollers 25 and 26 carried by the first assembly 16. Each bolt 94 is threadably received in a threaded bore 95 opening outwardly through an upper inclined surface 99 of each of the blade holder bodies 85. Each of the bolts 94 is headed at 96 for a purpose to be described more fully hereafter.

As the first and second assemblies 16 and 17, respectively, are moved relative to each other in a manner to be described hereafter, each of the bodies 85 pivots in a counterclockwise direction about an associated one of the bolts 86 to the position illustrated in FIGURE 6 of the drawings. This transforms a normally cylindrical volume defined by the three blades 88 to a generally frusto-conical volume, and also moves a cutting edge 97 of each of the blades 88 in a generally counterclockwise direction.

The third assembly 18 has a cutting head 100 carried by a shaft 101 received in an axial bore 102 (FIGURE 1) in the lower end portion 43 of the main shaft 41. Two identical set screws 103 secure the third assembly 18 in the bore 102 of the main shaft 41, in a manner clearly illustrated in FIGURE 4 of the drawings. The lower end portion 43 of the main shaft 41 is also provided with a pair of diametrically opposed flutes 104 which provide a relief area for wood-chips during a cutting operation.

The operation of the cutter unit or assembly 15 will be best described by referring to FIGURES 1, 5 and 6 of the drawings to which attention is now directed. A piece of stock material W which is preferably wood, is clamped in a conventional manner below the cutter unit 15. When the conventional drill press motor is energized, rotation is imparted to the shaft through the drill press quill. The shaft 13 in turn imparts rotation to the main shaft 41 which rotates the second cutter assembly 17 secured thereto by the set screw 72 (FIGURE 4). The rotation of the main shaft 41 similarly rotates the cutter head 100 of the third assembly 18. Since the second assembly 17 is joined to the first assembly 16 by the three bolts 74 passing through the openings 34 of the first assembly 16, this latter assembly is rotated by the second assembly 17. The first assembly 16 is in turn and rotation is thereby imparted to the tubular sleeve 35. Thus, rotation of the main shaft 41 is imparted in the manner above described to each of the three assemblies 16, 17 and 18 and to the cutting means or blades carried by the latter two of these assemblies.

The drill press quill 12 is then advanced vertically downwardly as viewed in FIGURE 1 causing simultaneous downward movement of each of the assemblies 16, 17 and 18. The cutting head 100 of the third assembly 18 first contacts and begins to cut an axial bore B in the stock material W. The end portion 43 of the main shaft 41 follows the cutting head 100 into the axial bore formed in the stock material W and eventually projects completely through the axial bore so formed to act as a guide for subsequent cutting operations performed by the blades 78 and 88 of the second assembly 17.

After the lower end portion 43 of the main shaft 41 enters the axial bore B formed in the stock material W, the cutting edge 83 of each of the three blades 78 begins to cut a circular cut in the material W. The circular cut is formed to a depth of approximately ⅝ inch at which point the thrust ball bearing 52 carried downwardly by the threaded end portion 48 of the tubular sleeve 35 contacts the upper surface 66 of the bight portion 56 of the U-shaped bracket 55. This contact between the bight portion 56 and the thrust ball bearing 52 prevents further downward movement of the tubular sleeve 35 and the first assembly 16 carried by the tubular sleeve 35. However, downward movement of the second assembly 17 is permitted against the force of the compression spring 46 acting between the thrust ball bearing 52 and the collar 50 secured to the upper end portion 42 of the main shaft 41.

While the first assembly 16 is now held vertically stationary (though still rotating), because of the contact between the bearing 52 and the bracket 55, further downward movement of the main shaft 41 carrying the second assembly 17 causes the bolts 74 to be guided downwardly through the openings 34 in the first assembly 16 and the camming elements or bolts 94 to be drawn downwardly through each of the gaps 33 between the rollers 25 and 26. Since the axes of the rollers 25 and 26 are offset with respect to a horizontal plane, as is best illustrated in FIGURE 5, the downward movement of the second assembly 17 relative to the first assembly 16 causes counterclockwise pivoting of each of the blade carrying bodies 85 about an associated one of the bolts 86. The cutting edges 97 of each of the blades 88 similarly pivot in a counterclockwise direction from the position illustrated in FIGURE 5 of the drawings to the position illustrated in FIGURE 6.

The gradual outward or counterclockwise pivoting of the blades 88 from a minor cutting radius toward a major cutting radius (equal to the cutting radius established by the blades 78) coupled with the downward movement of the assembly 17 relative to the assembly 16 forms a generally frusto-conical portion F from the stock material W, as shown in FIGURE 6. The blades 88 terminate their cutting when the quill 12 of the drill press bottoms during its downward advancement, or at such time as either the heads 96 of the bolts 94 or the heads 75 of the bolts 74 bottom against the first assembly 16. At such time the blades 78 have completed their cut through the stock material W (FIGURE 6) and the cutting of the blades 88 has terminated at a distance spaced above a lowermost portion of the stock material W to define a generally cylindrical or peripheral portion P adjacent the lowermost edge of the frusto-conical portion. The cutter unit 15 may now be retracted by retracting the drill press quill and subsequent repetitive operations may again be performed in the manner just described to produce additional paper roll plugs having axial bores and generally frusto-conical external surfaces terminating in a cylindrical portion or shoulder.

While a preferred form of the invention has been heretofore described, it is to be understood that the cutter mechanism 10 is merely exemplary of the invention and all structural modifications apparent to those having reviewed this disclosure are considered within the scope of this invention.

For example, both of the plates 20 and 70 could be made larger to accommodate additional rollers, such as the rollers 25 and 26, and additional bores or opening, such as the bores or openings 87 could be provided in the plate 70. By selectively positioning the camming bolts 94 in gaps established by such additional rollers and pivoting the plate holder bodies 85 in other of the so provided bores, paper roll plugs of diverse diameters and tapers can be formed by the apparatus of this invention.

If desired, the three camming elements or bolts 94 can be each curved slightly to produce plugs having a convex taper.

While only a single of the cutter mechanisms 10 has been disclosed herein, it is also within the scope of this invention to employ a plurality of such cutter mechanisms with any conventional machines of a multiple-spindle type to produce a plurality of paper plugs by a single descent of each of the cutter units 15.

While an example disclosure of a preferred form of the plug cutter is disclosed herein, it is to be understood that variations in the construction and components thereof may be made as noted above without departing from the spirit and scope of this invention as defined in the appended claims.

I claim:

1. A cutter mechanism comprising a rotatable cutter unit adapted for cutting a disc-like article having upper and lower surfaces and an exterior frusto-conical portion terminating at a point spaced from said lower surface at an exterior cylindrical shoulder, said cutter unit comprising first and second cutter means, said first and second cutter means having cutting portions normally disposed in coaxial relationship, said first cutter means being normally disposed radially inwardly of said second cutter means, said first cutter means being operative for cutting an exterior frusto-conical portion of a disc-like article, said second cutter means being operative for cutting an exterior cylindrical shoulder of the article which intersects the exterior frusto-conical portion at a point spaced from the lower surface thereof, said cutting portions of the first and second cutter means normally defining generally coaxial hollow annular cylindrical volumes in a first relative position thereof upon the rotation of said cutter unit, means for progressively shifting the cutting portion of said first cutter means radially outwardly toward said second cutter means, and means for controlling the shifting means for causing the hollow, annular cylindrical volume of the first cutter means to be transformed into a generally hollow annular frusto-conical volume which intersects the hollow annular cylindrical volume of the second cutter means at a point spaced from the lower surface of the article and at a major radius portion of the hollow annular frusto-conical volume whereby the article is provided with an exterior frusto-conical portion merging with an exterior cylindrical shoulder at a point spaced from the lower surface of the article.

2. The cutter mechanism as defined in claim 1 wherein said shifting means includes means for pivoting said first cutter means from said first relative position to transform the normally hollow annular cylindrical volume defined thereby to the generally hollow annular frusto-conical volume.

3. The cutter mechanism as defined in claim 1 wherein said mechanism includes first and second supports, means reciprocally mounting the first and second supports relative to each other, said first and second cutter means being carried by one of said supports, and said control means being cooperative between said first and second supports for controlling the progressive shifting of the cutting portion of said first cutter means upon relative movement between said first and second supports.

4. The cutter mechanism as defined in claim 1 wherein said mechanism includes first and second supports, means reciprocally mounting the first and second supports relative to each other, said first and second cutter means being carried by one of said supports, said control means being operatively associated between said first and second supports for controlling the shifting of the cutting portion of the first cutter means upon relative movement between said first and second supports, and said control means including camming means for transforming the relative reciprocal movement between said supports into angular movement of said first cutter means.

5. The cutter mechanism as defined in claim 1 wherein said first cutter means is pivotally carried by said cutter unit, and said controlling means comprises camming means operable by relative movement between portions of said cutter unit for transforming relative movement between the cutter unit portions into pivotal movement of said first cutter means.

6. The cutter mechanism as defined in claim 1 wherein said cutter unit includes first and second relatively movable supports, said first cutter means comprises a blade holder body, said body being pivotally carried by said second support, said controlling means including a cam element forming a portion of said blade holder body, and said first support including means cooperative with said cam element whereby relative movement between said first and second supports causes cammed pivotal movement of said blade holder body.

7. The cutter mechanism as defined in claim 1 wherein said cutter unit additionally includes third cutter means, said third cutter means being positioned internally of and in coaxial relationship to both said first and second cutter means, said third cutter means being operative for cutting a bore through the axial center of the disc-like article, and said third cutter means at all times defining a cylindrical volume upon the rotation of said cutter unit.

8. The cutter mechanism as defined in claim 1 wherein said first and second cutter means are a plurality of respective first and second blades having terminal cutting edges, and means for relatively adjusting the first and second blades to selectively axially space the cutting edges thereof whereby the point of intersection between the hollow annular frusto-conical volume and the second cutter volume is varied to permit disc-like articles to be cut which have exterior cylindrical shoulders of varying axial heights.

References Cited by the Examiner

UNITED STATES PATENTS

| | | | |
|---|---|---|---|
| 28,640 | 6/1860 | Tiebout | 144—24 |
| 187,951 | 2/1877 | Wiley | 144—24 |
| 234,966 | 11/1880 | Conroy | 144—24 |
| 841,646 | 1/1907 | Hellstrom et al. | 144—24 |
| 845,360 | 2/1907 | Jungling | 77—58.41 |
| 911,308 | 2/1909 | Kincaid | 144—24 |
| 1,354,848 | 10/1920 | Schilling et al. | 144—24 |
| 2,349,400 | 5/1944 | Beckwith | 145—120 |
| 2,663,203 | 12/1953 | Fried | 77—58.41 |
| 2,818,753 | 1/1958 | Leggett | 77—58.41 |

HAROLD D. WHITEHEAD, *Primary Examiner.*

WILLIAM W. DYER, JR., *Examiner.*